United States Patent [19]

Stapp et al.

[11] Patent Number: 5,302,684
[45] Date of Patent: Apr. 12, 1994

[54] SILICONIMIDES

[75] Inventors: Bernhard Stapp, Kalchreuth; Armin Datz, Poxdorf; Volker Muhrer, Fuerth, all of Fed. Rep. of Germany; Gabriele Moesges, deceased, late of Hemhofen, Fed. Rep. of Germany, by Heinz Moesges, executor

[73] Assignee: Siemens Aktiengesellschaft, Munich, Fed. Rep. of Germany

[21] Appl. No.: 913,276

[22] Filed: Jul. 14, 1992

[30] Foreign Application Priority Data

Jul. 16, 1991 [DE] Fed. Rep. of Germany ....... 4123574

[51] Int. Cl.$^5$ ...................... C08G 77/14; C08G 77/26
[52] U.S. Cl. ......................... 528/26; 528/28; 528/41; 525/474; 549/214
[58] Field of Search .................. 528/26, 28, 41; 525/474; 549/214

[56] References Cited

U.S. PATENT DOCUMENTS

| | | | |
|---|---|---|---|
| 4,197,397 | 4/1980 | D'Alelio | 528/222 |
| 4,404,350 | 9/1983 | Ryang | 528/26 |
| 4,495,342 | 1/1985 | Landis | 528/125 |
| 4,595,732 | 6/1986 | Ryang | 525/417 |
| 4,795,680 | 1/1989 | Rich et al. | 428/450 |
| 4,985,527 | 1/1991 | Michaud et al. | 528/26 |

*Primary Examiner*—Melvyn I. Marquis
*Assistant Examiner*—Margaret W. Glass
*Attorney, Agent, or Firm*—Kenyon & Kenyon

[57] ABSTRACT

Siliconimides, which contain cross-linkable, functional groups, having the general formula

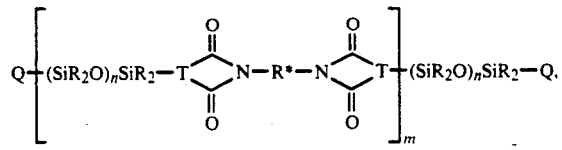

in which the Q residues contain the functional groups.

1 Claim, No Drawings

SILICONIMIDES

FIELD OF THE INVENTION

The invention relates to new functional siliconimides as well as to a method for their preparation.

BACKGROUND OF THE INVENTION

Polyimides are plastics with many technical uses. Various methods are known for producing polyimides, particularly where the preparation takes place in a two-stage polycondensation reaction of a tetracarboxylic acid dianhydride with a diamine in solution. In the first stage, a polyamido carboxylic acid is obtained, which in the second stage is transformed thermally—at temperatures up to 400° C.—or chemically—with dehydrating agents—under dehydration into the polyimide. According to this method, both purely carbonorganic polyimides as well as siliconimides can be produced. U.S. Pat. Nos. 3,325,450, 3,847,867 and 4,558,110, for example, describe the preparation of siliconimides from organic anhydrides and amino functional silicones. The preparation of siliconimides from anhydride-functional silicones and organic dismines is known from the German Published Patent Application 38 03 088, U.S. Pat. Nos. 4,404,350 and 4,794,153.

Another way to produce polyimides is by reacting isocyanates with carboxylic acid anhydrides while separating carbon dioxide (see, for example, U.S. Pat. No. 4,021,412). Lewis acids and tertiary amines catalyze this reaction, but the admixture of small quantities of alcohol or water is also believed to have an advantageous effect (see German Published Patent Application 19 58 900 as well as *Polym. Prepr.*, vol. 9 (1968), pp. 1581 to 1586).

German Published Patent Application 37 01 249 discloses a method for producing alkoxy- and aryloxy-substituted aromatic polyimides, in which in an initial reaction aromatic diisocyanates blocked with 1,3-imidazole are produced. They are subsequently made to react in a dipolar, aprotic solvent, suitably in the presence of a catalyst, with aromatic tetracarboxylic acid dianhydrides. The high-molecular, purely carbon-organic polyimides prepared in solution in this manner, which do not exhibit any cross-linkable functions, can be processed in the solution, or rather are plastically deformable in the melt.

SUMMARY OF THE INVENTION

The invention provides siliconimides, which contain cross-linkable, function groups and are of the general formula

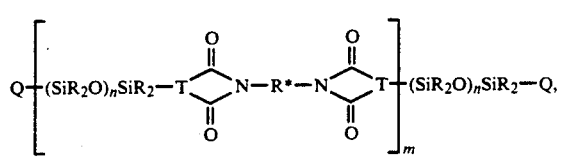

in which $Q=Q^1$ or $Q^2$,

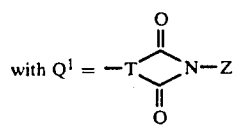

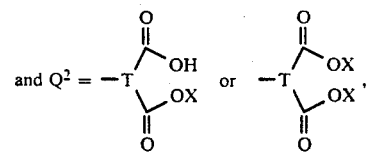

$m$ is an integer from 0 to 10 (when $Q=Q^1$) or from 1 to 10 (when $Q=Q^2$) and $n$ is an integer from 1 to 50, and the following applies for the groups R, R* T, X and Z:

R = alkyl, cycloalkyl, aryl, aralkyl or alkaryl;

R* = —(CH$_2$)$_6$—, —CH$_2$—C(CH$_3$)$_2$—CH$_2$—CHCH$_3$—(CH$_2$)$_2$—

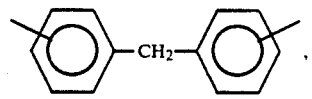

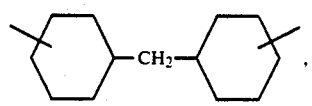

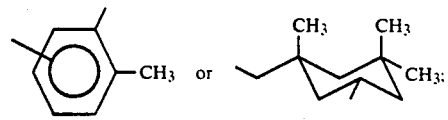

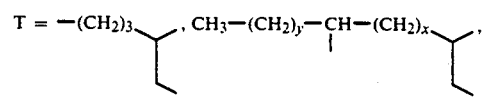

$x = 1$ or $2$
$y = 0$ or $1 \ldots 16$

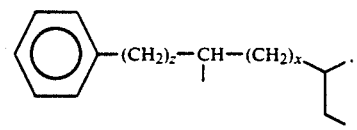

$x = 1$ or $2$
$z = 0$ or $1$

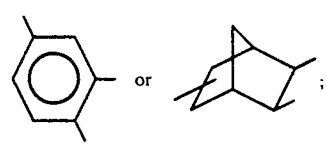

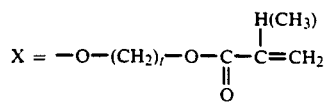

where $t = 2, 3$ or $4$;

-continued

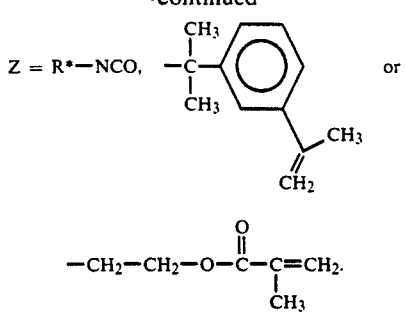

$$-CH_2-CH_2-O-\overset{O}{\underset{CH_3}{\overset{\parallel}{C}}}-\underset{CH_3}{\overset{|}{C}}=CH_2.$$

The R residues represent alkyl, cycloalkyl, aryl, aralkyl or alkaryl groups, where these groups can be unsubstituted or substituted. The following groups are named as examples for the R residues, Alkyl with 1 to 4 C atoms, such as methyl, ethyl, proply, isopropyl, butyl and isobutyl, where the methyl residue is preferred;

Cycloalkyl with 5 to 8 C atoms, such as cyclohexyl, methylcyclohexyl and cycloheptayl;

Aryl with 6 to 10 C atoms, such are phenyl and naphythyl;

Aralkyl, such as $\beta$-phenylethyl, $\beta$-phenylpropyl, o-methyl phenylethyl 3,5-dimethylphenylethyl, p-nonylphenylethyl, o-bromophenylethyl, 3,5-dibromophenylethyl, p-chlorophenylethyl and 3,5-dichlorophenylethyl;

Alkaryl, such as tolyl.

The compounds according to the invention are new oligomer siliconimides with cross-linkable functions, that is prepolymers, which can be hardened either directly or by reacting with other unsaturated compounds. If the cross-linkable functions are (meth)acrylate groups, then they can be subjected, for example, to a thermally or UV-initiated radical polymerization. Isocyanate- or isopropenyl-functional siliconimides can be hardened in various ways known in the art. Thus, for example, isocyanates can be hardened into polyisocyanurates or be converted with alcohols into polyurethanes. However, they can also be converted—in combination with epoxides—into network polymers containing oxazolidinone structures.

DETAILED DESCRIPTION

The siliconimides according to the invention are produced starting from silicone tetracarboxylic acid dianhydrides of the general formula

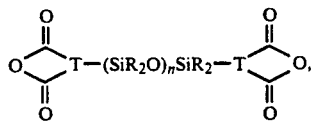

in which R, T and n have the meaning indicated above.

Silicone tetracarboxylic acid dianhydrides of the type mentioned above can be produced directly, for example, by hydrosilylating the allyl function of allyl succinic acid anhydride (see German Published Patent Application 34 47 457), by hydrosilylating the olefinic dual bond of norbornene dicarboxylic acid anhydride (see U.S. Pat. No. 4,381,396), or by hydrosilylating alkenyl succinic acid anhydride; the preparation of alkenyl succinic acid anhydride is described, for example, in *Applied Macromol. Chem.* [Angew. Makromol. Chem.], vol. 185/186 (1991), pp. 129–136. The hydrosilylation takes place—in the presence of platinum catalysts—with polyorganosiloxanes, which carry terminal Si-bonded hydrogen. It is possible to modify their organosiloxane component of anhydride-functional di- and polysiloxanes through equilibration with organocyclopolysiloxanes, such as octamethylcyclotetrasiloxane, in the presence of a suitable equilibration catalyst (see *Macromolecules*, vol. 20 (1987), pp. 694–696). A method of preparation for polysiloxanes with phthalic acid anhydride functions is found in *J. Org. Chem.*, vol. 38 (1973), pp. 4271–4274.

The preparation of cross-linkable siliconimides according to the invention is based on the realization that anhydride-functional siloxanes of the above-mentioned type can be reacted with blocked isocyanates to yield siliconimides. "Blocked" isocyanates are understood to be compounds, whose NCOgroups are converted by means of a blocking agent in the form of a compound (A—H) having an active hydrogen (formation of —N-H—COA).

The siliconimides according to the invention are produced at relatively low temperatures, taking into consideration the limited thermal loading capacity of the functional groups of these compounds. The conversion reaction between the anhydride-functional siloxanes and the blocked isocyanates occurs—depending on the constitution of the applied isocyanate adducts—at temperatures between room temperature and 140° C., preferably at temperatures between 70 and 110° C. The progressing of the reaction can be followed on the basis of the liberated quantity of carbon dioxide. The reaction itself—depending on the miscability of initial components—can take place without solvents or with the admixture of organic solvents.

The following compounds can serve as blocking agents: imidazole and imidazole derivatives, such as ethyl imidazole, benzotriazole, phenol, methyl salicylate and oximes, such as 2-propanone oxime, 2-butanone oxime, 3-pentanone oxime, 2- or 3-hexanone oxime, cyclopentanone oxime, cyclohexanone oxime, acetophenone oxime and benzophenone oxime; preferred thereby are imidazole and 2-butanone oxime. The conversion with the isocyanate takes place in the molar ratio NCO: blocking agent, that is active hydrogen, as 1:1.

The imidazole adducts of the isocynates are prepared in a generally known way by reacting equimolar quantities of an isocyanate compound with imidazole (see *Liebig's Am. Chem.*, vol. 648 (1961), pp. 72 to 82). The reaction preferably takes place thereby in inert solvents, such as tetrahydrofuran and toluol, and at room temperature; the conversion products can be isolated as solids. The oxime adducts of the isocyanates are prepared—in a method familiar to those skilled in the art—by reacting equimolar quantities of an isocyanate compound and of I an oxime, such as 2-butanone oxime.

With the method according to the invention, the following compounds are preferably used as diisocyanates: hexamethylene diisocyanate, trimethylhexamethylene diisocyanate, diphenylmethane diisocyanate, dicyclohexyldiisocyanate, toluylene diisocyanate and isophorone diisocyanate.

The siliconimides according to the invention, which exhibit cross-linkable functional groups, can be produced in different ways. In the case of a first method, in a first process step, a diisocyanate of the formula OC-N—R*—NCO, in which R* has the meaning indicated above, is reacted with a blocking agent in the form of a compound having an active hydrogen in the molar ratio 1:2. The resulting blocked diisocyanate is then made to react in a second reaction step with an anhydridefunctional silicone of the above mentioned type in the molar ratio of 1.1:1 to 2:1. The reaction products represent compounds according to the invention and, in the average, are siliconimide block copolymers of a linear structure, which—depending on the isocyanate adducts and the conditions of the reaction—carry terminal isocyanate groups or partially blocked isocyanate groups.

Another characteristic of the invention is that the isocyanate-functional siliconimides can also be converted with olefinic unsaturated anhydrides into cross-linkable siliconimides. Examples of suitable olefinic unsaturated anhydrides are: 5-norbornene-2,3-dicarboxylic acid anhydride, 4-cyclohexene-1,2-dicarboxylic acid anhydride, maleic acid anhydride and allyl succinic acid anhydride. The conversion reaction with the olefinically unsaturated anhydrides takes place in a way that corresponds to the anhydride-functional silicones, that is a blocked NCO-group reacts with the anhydride group to form imide.

In the case of a second method for producing the siliconimides according to the invention, the diisocyanates—in the form of the blocking adducts prepared from these—are made to react with the anhydride-functional silicones in the molar ratio of 1:1.1 to 1:2. The products obtained thereby, in the average, are terminal anhydride-functional siliconimide block copolymers of a linear structure. One arrives at the compounds according to the invention when the anhydride groups of these siliconimides are at least partially converted into (meth)acrylate groups. This occurs—in a generally known way (see German Published Patent Application 28 09 874 and German Published Patent Application 34 47 457)—by reacting with hydroxyfunctional (meth)acrylates to form the appropriate unsaturated mono- or diesters.

Preferably, hydroxyethyl-(meth)acrylate, hydroxypropyl-(meth)acrylate and hydroxybutyl-(meth)-acrylate are used as hydroxyfunctional (meth)acrylates, that is olefinically unsaturated alcohols. In addition, however, the multiple (methyl)acrylic-acid esters of pentaerythritol, trimethylolethane, trimethylolpropane and glycerol, as well as their dimers can find application.

Another possibility for converting the terminal, anhydride-functional siliconimide copolymers into compounds according to the invention consists in reacting them with a blocked monoisocyanate in the form of m-isopropenyl-$\alpha,\alpha'$,-dimethylbenzylisocyanate or isocyanatoethylmethacrylate. In the first case, isopropenyl-functional siliconimides are obtained. In the latter case, methacrylate-functional siliconimides are obtained. By reacting with allylisocyanate, allyl-functional siliconimides can also be produced.

In another specific embodiment of the method according to the invention, isopropenyl- or methacrylate-functional siliconimides are produced by reacting blocked monoisocyanates of the above-mentioned type with the anhydride-functional siloxanes in the molar ratio of 2:1.

The properties of the siliconimides according to the invention are determined by the ratio of the carbon-organic structures to the silicon-organic structures. Therefore, in the preparation of the siliconimides, one aspect of the invention lies in applying the anhydride-functional silicones in combination with carbon-organic anhydrides, such as pyromellitic acid dianhydride and/or 3,3', 4,4'-benzophenone tetracarboxylic acid dianhydride and/or oxy-bis(4-phthalic acid anhydride). It is advantageous to replace the anhydride-functional silicones in the specific reaction mixture up to a concentration of 50 mol.-%, preferably up to 30 mol.-%, by carbon-organic anhydrides.

The invention shall be described in still greater detail on the basis of exemplified embodiments.

EXAMPLE 1

Preparing a silicon tetracarboxylic acid dianhydride 58 g of hexadecamethyl-octasiloxane (0.1 mol), 100 ml toluol and 0.5 ml of a solution of a platinum/ divinyltetramethyldisiloxane complex (solution in xylol with to 3.5 % Pt, calculated as element) are placed in a round-bottomed flask provided with a reflux condenser, agitator, dropping funnel, and internal thermometer. A mixture of 32.8 g cis-5-norbornene-endo-2, 3-dicarboxylic acid anhydride (0.2 mol) and 100 ml toluol is added dropwise by stirring it into this mixture in less than 2 h at 90° C. g. After heating for 12 hours at 90° C. and for 12 hours, with refluxing, the reaction is complete. Activated carbon is then added to the reaction solution and the solution is filtered. After removing the solvent at 50° C. in a vacuum (at a pressure of 0.1 mbar), 86 g of $\alpha,\omega$-silicon-bis-norbornane dicarboxylic acid anhydride are obtained (viscosity at 25° C.: 600 mPa.s) The IR- and $^{13}$C-NMR-data confirm the following structure:

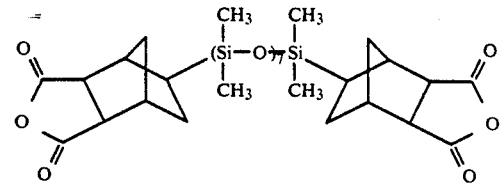

EXAMPLE 2

Preparing a Blocked Diisocyanate

A solution of 25 g 4,4'-diphenylmethanediisocyanate (0.1 mol) in 50 ml tetrahydrofuran is added by stirring into a solution of 13.6 g imidazole (0.2 mol) in 100 ml tetrahydrofuran at room temperature. After the resulting exothermic reaction quiets down, the solution is still stirred for 1 h at 60° C. After the solution cools off, the precipitated product is filtered off and dried (melting point: 185° C.) The IR—and $^{13}$C-NMR-data confirm the structure of the 4,4'-bis(imidazolyl carboxylic acid-1-amido)-diphenylmethane.

EXAMPLE 3

Preparation of an Anhydride-Functional Siliconimide 90.7 g of the $\alpha,\omega$-silicon-bis-norbornane-dicarboxylicacid anhydride (0.1 mol) prepared according to Example 1 are mixed in a round-bottomed flask with 19.3 g of the blocked diisocyanate (0.05 mol) prepared according to Example 2, and the mixture is then heated within 5 min to 90° C. When the volumetrically determined quantity of carbon dioxide forming in the thereby occurring reaction remains constant, the mixture is then filtered off through a membrane filter (pore size: 0.45μ). Residual imidazole is sublimated off from the filtrate at 90° C. in a vacuum. The IR- and —C-NMR data confirm the structure of the resulting anhydride-functional siliconimide (viscosity at 25° C.: 30 Pa. s).

EXAMPLE 4

Preparation of an Acrylate-Functional Siliconimide 22 g of the anhydride-functional siliconimide (0.01 mol) prepared according to Example 3, 0.01 g phenothiazine, and 100 ml toluol are placed in a round-bottomed flask provided with a dropping funnel. A solution of 4.64 g of hydroxyethylacrylate (0.04 mol) in 100 ml toluol is added dropwise to the mixture at 90° C. within 1 h. After being stirred for 2 hours at 100° C., the solvent is removed in a vacuum. The IR data confirm the structure of the resulting acrylate-functional siliconimide,

EXAMPLE 5

Preparation of an Isocyanate-Functional Siliconimide 36 g of the α,ω-silicon-bis-norbornane-dicarboxylic acid anhydride (0.04 mol) prepared according to Example 1 are mixed in a round-bottomed flask with 18 g of imidazole-blocked hexamethylenediisocyanate (0.06 mol) and the mixture is then heated within 5 h to 90° C. When the volumetrically determined quantity of the carbon dioxide forming in the thereby occurring reaction remains constant, the imidazole is sublimated off at 130° C. in a vacuum. The IR- and $^{13}$C-NMR data confirm the structure of the resulting isocyanate-functional siliconimide (viscosity at 25° C.: 600 Pa.s)

EXAMPLE 6

Preparation of an Isocyanate-Functional Siliconimide 19.6 g of the anhydride-functional siliconimide (0.01 mol) prepared according to Example 3 are mixed in a roundbottomed flask with 6.2 g of imidazole-blocked toluylene diisocyanate (0.02 mol), dissolved in 10 ml dimethylacetamide, and the mixture is then heated within 5 min to 100° C. When the volumetrically determined quantity of carbon dioxide forming in the thereby occurring reaction remains constant, the mixture is filtered off through a membrane filter (pore size: 0.45μ). Residual imidazole is sublimated off from the filtrate at 130° C. in a vacuum. The IR- and $^{13}$C-NMR data confirm the structure of the resulting isocyanate-functional siliconimide.

EXAMPLE 7

Preparation of a Blocked Monoisocyanate 40.2 g of m-isopropenyl- α,α'-dimethylbenzylisocyanate (0.2 mol) are added by stirring into a solution of 13.6 g of imidazole (0.2 mol) in 50 ml tetrahydrofuran at room temperature. After the resulting exothermic reaction quiets down, the solution is still stirred for 1 h at 60° C. The solution is subsequently concentrated by evaporation down to one half and cooled off, and the precipitating product is then filtered off and dried (melting point: 108° C.) The IR- and $^{13}$C-NMR-data confirm the structure of the imidazole-1-carboxylic acid-m-isopropenyl- α,α'-dimethylbenzylamide.

EXAMPLE 8

Preparation of an Isopropenyl-Functional Siliconimide 19.6 g of the anhydride-functional siliconimide (0.01 mol) prepared according to Example 3 are mixed in a roundbottomed flask with 5.35 g of the blocked monoisocyanate (0.02 mol) prepared according to Example 7, and the mixture is then heated within 5 min to 90° C. When the volumetrically determined quantity of carbon dioxide forming in the occurring reaction remains constant, the mixture is filtered off through a membrane filter (pore size: 0.45μ). Residual imidazole is sublimated off from the filtrate at 100° C. in a vacuum. The IR- and $^{13}$C-NMR data confirm the structure of the resulting isopropenylfunctional siliconimide.

EXAMPLE 9

Preparation of an Isopropenyl-Functional Siliconimide 17.1 g of α,ω-silicon-bis-propyl succinic acid anhydride (0.02 mol) are mixed in a round-bottomed flask with 10.7 g of the blocked monoisocyanate (0.04 mol) prepared according to Example 7 and 0.01 g phenothiazine, and the mixture is then heated within 5 min to 100° C. When the volumetrically determined quantity of carbon dioxide forming in the occurring reaction remains constant, the imidazole is sublimated off at 100° C. in a vacuum. The IR- and $^{13}$C-NMR data confirm the structure of the resulting isopropenyl-functional siliconimide.

What is claimed is:

1. A siliconimide which contains cross-linkable, functional groups, the siliconimide having a general formula

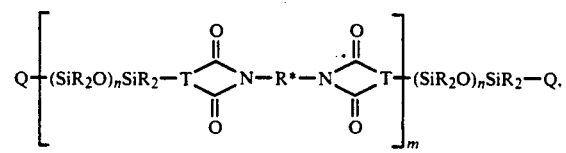

in which Q = Q$^1$ or Q$^2$,

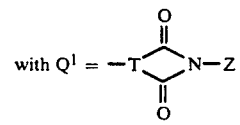

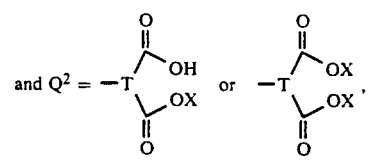

m is an integer from 0 to 10, when Q=Q$^1$,
m is an integer from 1 to 10, when Q=Q$^2$,
n is an integer from 0 to 50,
R=alkyl, cycloalkyl, aryl, aralkyl or alkaryl;
R*=—(CH$_2$)$_6$—, —CH$_2$—C(CH$_3$)$_2$—CH$_2$—CHCH$_3$—(CH$_2$)$_2$—,

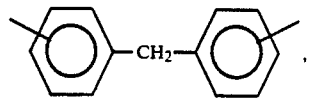

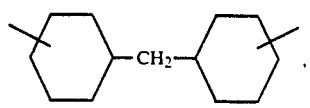

-continued
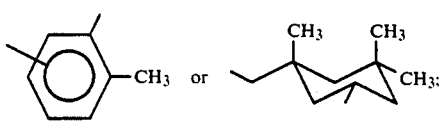
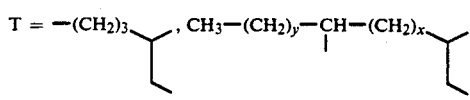
x = 1 or 2
y = an integer of from 0 to 16, inclusive
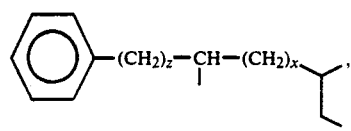
x = 1 or 2
z = 0 or 1
-continued
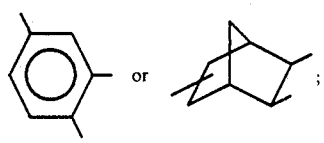
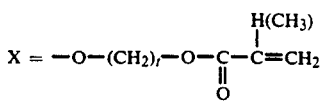
where t = 2, 3 or 4;
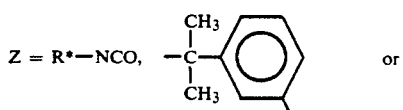
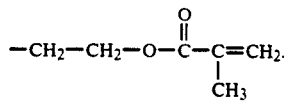
* * * * *